United States Patent [19]
Faxen et al.

[11] 4,019,529
[45] Apr. 26, 1977

[54] VALVE WITH ROLLER

[75] Inventors: Per Torsten Faxen, Bromma; Frans Harry Karlsson, Lund, both of Sweden

[73] Assignee: Hykon-Patent Aktiebolag, Lund, Sweden

[22] Filed: May 12, 1975

[21] Appl. No.: 576,520

[30] Foreign Application Priority Data

May 13, 1974 Sweden .............................. 7406344

[52] U.S. Cl. ................................ 137/218; 251/261; 251/301
[51] Int. Cl.² .................... F16K 1/16; F16K 45/00
[58] Field of Search ............. 137/217, 218, 625.44, 137/625.48; 251/261, 301

[56] References Cited
UNITED STATES PATENTS

| | | | |
|---|---|---|---|
| 870,377 | 11/1907 | Marett | 251/301 X |
| 2,165,874 | 7/1939 | Sauls | 137/625.44 |
| 2,517,534 | 8/1950 | Courtot | 251/261 X |
| 2,730,115 | 1/1956 | Hempel | 137/217 |
| 3,538,953 | 11/1970 | Berger | 137/625.46 |
| 3,684,242 | 8/1972 | Hauffe et al. | 137/625.46 X |

*Primary Examiner*—William R. Cline
*Attorney, Agent, or Firm*—Beveridge, DeGrandi, Kline & Lunsford

[57] ABSTRACT

This invention relates to a valve having a valve member in the form of a roller supported by a roller support such that the roller when moved to closed position is forced against a valve seat and such that inlet pressure in said valve aids in maintaining said roller in a tight closed position, said valve preferably comprising a tubular valve housing having an axial inlet and a peripheral outlet.

4 Claims, 3 Drawing Figures

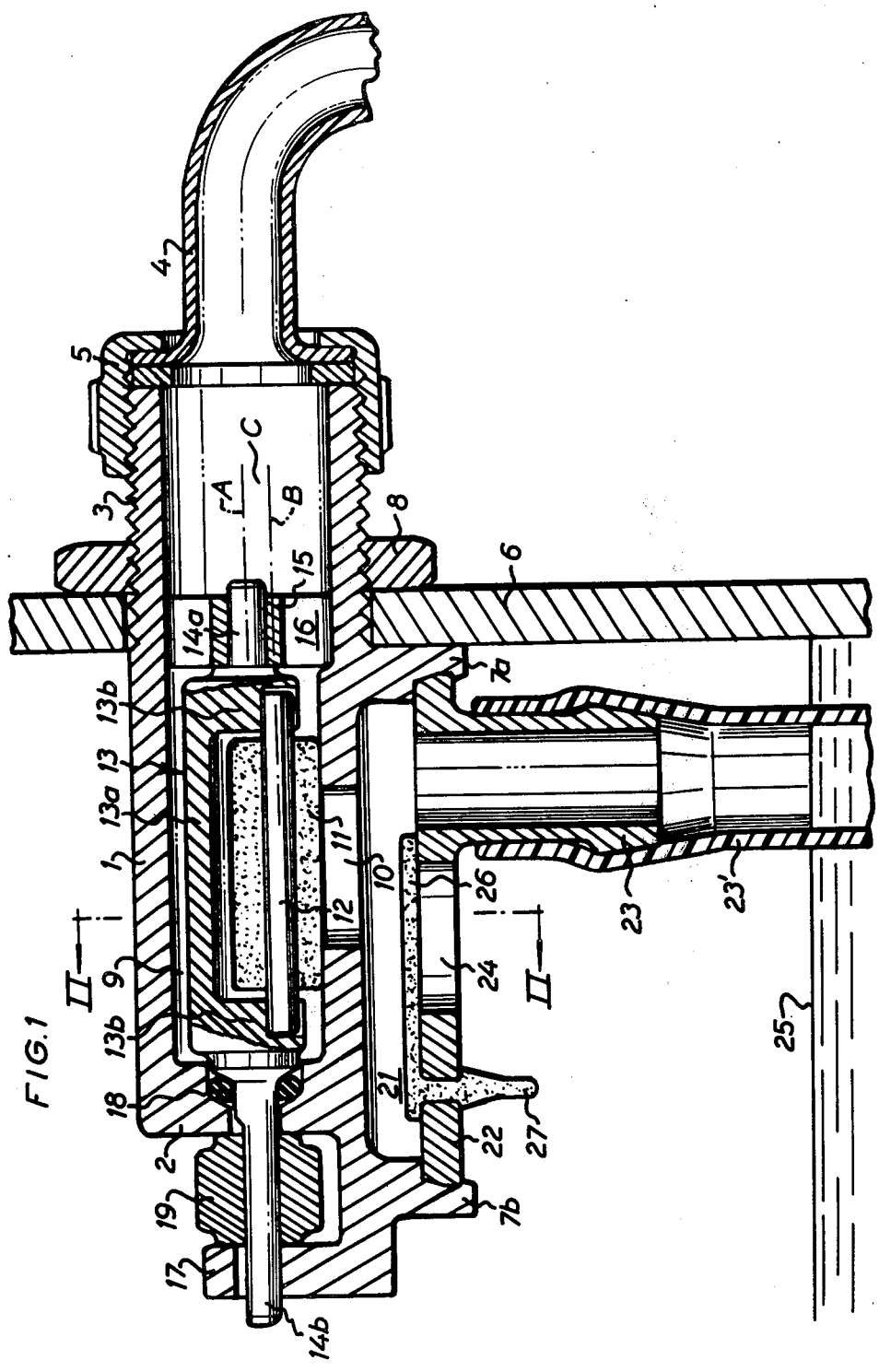

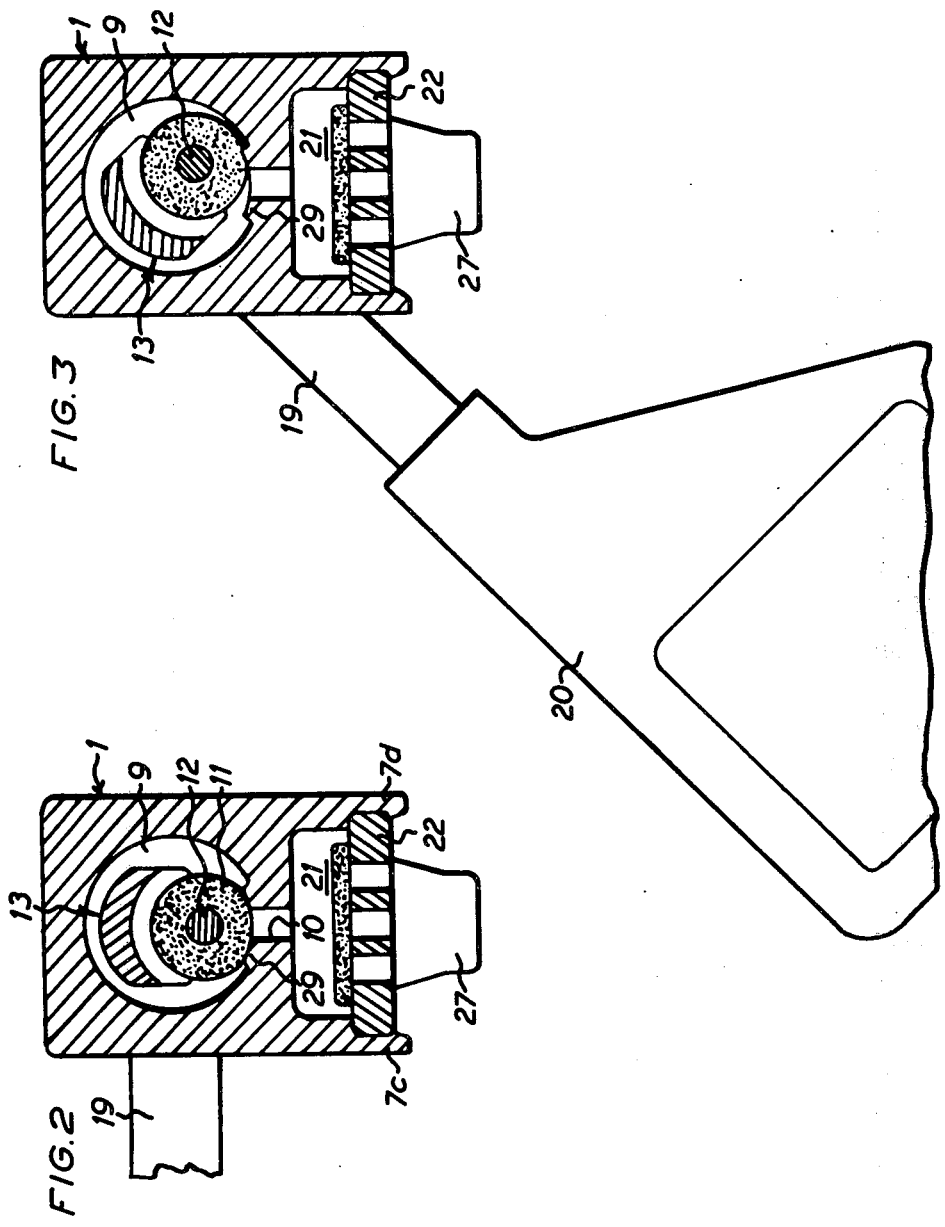

VALVE WITH ROLLER

The present invention relates to a valve which is based on the valve described in U.S. Pat. No. 3,465,785, and in particular to a valve having a wall having a port therein, and a closing device comprising a roller support movably mounted on the pressure side of the wall and operable by the intermediary of an operating means, and a roller rotatably journaled in the roller support, the roller being disposed, on actuation of the roller support for closing the valve, to roll on a surface of the wall to a closing position, in which the port is fully covered by part of the circumference of the roller.

Like the valve according to the above-mentioned patent, the valve according to the present invention is intended primarily to serve as a valve for the automatic refilling of the flushing water cistern of a water closet after each flushing, though it can also be used for other purposes.

The valve according to the above Patent displays a surface having a port therein, and a roller abutting against the surface and movable in relation thereto for the opening and closing of the valve, the roller being disposed, on movement relative to said surface having the port therein, to roll thereon and, in the closed position of the valve, to fully cover and block the port in said surface with a small portion of its circumference. In one embodiment, the prior art valve comprises four rollers and the surface having the port therein consists of a tubular outwardly cylindrical tubular body with four ports or slots which can each be blocked by one of the four rollers rotatably supported by means of stub shafts journaled in the cylindrical body.

Opening and closing of the valve according to the abovementioned patent require a certain, though because of the rolling principle, relatively small operating moment for rotating one or more of the roller-shaped valve members relative to the cylindrical tubular body. If the rollers consist of resilient material they can easily be mounted for each desired engagement force or bias against the tubular body, and such a bias can be utilized to cause the resilient rollers, in the closed position, to maintain a seal against a considerable water pressure within the tubular body. However, the bias naturally increases the requisite operating moment.

However, the operating moment should not be allowed to become so great that there is a risk the operating force is unable to open and close the valve when the water in the flushing cistern has reached the level at which adjustment is to take place. For this reason, the operating moment must be adapted with respect to the adjusting force of the operating device, normally a float, influenced by the water level.

A further embodiment of the valve is mentioned at the end of the specification of the above patent. In this embodiment the roller or rollers should be disposed within a tubular body instead of outside it, but no detailed mention is made in the patent specification of how such a valve is to be constructed. Moreover, the embodiment shown in the patent specification is not easily modified. For example, the valve housing would need to have a large cavity to accommodate the support means for the rollers and considerable wall thickness to resist the mains pressure acting from the inside.

Generally, the design of a refilling valve for each particular case is determined, on the one hand, by the highest prevailing pressure in the water mains system in which the valve is to operate, and on the other hand, by the fact that the dimensions of the buoyant operating device should be sufficient for the requisite adjusting force. The maximum dimensions for this device are determined by the space available.

The object of the present invention is to provide as low an operating moment as possible for the valve without the risk of a poor seal at high water pressures, thereby permitting the use of operating devices of relatively small dimensions, which can be adapted to the space available and will ensure reliable adjusting operations.

Further objects of the invention are to provide a dependable valve with a roller and a roller support of tough, compact construction to permit using valve housings of a relatively small inner diameter and possibly of an inexpensive material, such as plastic.

According to the invention, the roller support is mounted for rotational movement about an axis which is parallel to and located a distance from the axis of the roller, the distance between said axes, the distance from said axes to said surface and the radius of the roller being selected such that the axis of the roller on rotation of said roller support in a direction for closing of the valve, is moved in a circular path which approaches said wall and reaches a point of shortest distance therefrom substantially in the closed position of said roller in relation to said passage.

By placing the roller, in the valve according to the invention, on the pressure side of the passage (port or slot) which the roller, in closed position, is to seal, the mains pressure helps in holding the roller in tight engagement in the closed position. Because of this, and because of the fact that the valve is provided with a new type of roller support, the extra closing force (in addition to the mains pressure) which may be necessary, will be as small as possible. Moreover, because the bias moment can thus be low the size of the operating moment will be reduced.

The invention will be described in greater detail hereinbelow and with reference to the enclosed drawings, on which:

FIG. 1 is an axial section of a valve according to the invention mounted in an opening in a flushing cistern wall, in which valve the closing device is connected to an operating arm to be operated by means of a float;

FIG. 2 is a cross-section of the valve in FIG. 1 along the line II—II, and with the closing device in closed position; and FIG. 3 is a view similar to FIG. 2, but showing the valve in an open position and the connection of the operating arm to a float.

The valve according to the invention comprises an elongated, substantially tubular valve housing 1 having a central, cylindrical cavity which is closed at one end 2 and at the opposite end is extended to form an inlet socket 3. The socket 3 is externally threaded for connection to a conduit 4 for water under pressure by means of an internally threaded sleeve 5 mounted on the inlet socket.

In the illustrated embodiment, the valve is used as a float regulated refilling valve for a flushing cistern connected to a water closet. Of the cistern and the closet only a wall portion of the former is shown at 6. The valve housing 1 is mounted with its inlet socket 3 in an opening in the cistern wall 6, against which the valve housing is fixedly maintained by means of an extension 7a of the valve housing which abuts against the inside of the wall 6, and of a nut 8 which is applied to the socket 3 and abuts against the outer side of the wall 6.

In the region of the central cavity 9, the valve housing has an outlet in form of a longitudinal slot 10 and, in a region bordering the slot 10, a valve seat and in connection therewith a cylindrical roller surface for a roller 11 rotatably supported on a shaft 12 which is journaled at its opposing ends in a roller support 13. The roller support 13 is in the form of an elongated body which has a recess of a size sufficient to accommodate the entire length of the roller 11 and a greater part of the roller diameter. The roller support is rotatably mounted in the valve housing by means of stub shafts 14a, 14b, one of which is journaled in a hub 15 supported by means of a spider 16 mounted in the valve housing 1 at the end thereof which merges into said inlet socket 3. The stub shaft 14b at the other end of the roller support 13 is journaled in a central opening in the end wall 2 of the valve housing and in an opening in a bracket-like projection 17 on the valve housing. At this end wall 2 the valve housing is sealed by means of a sealing ring 18 mounted on the stub shaft 14b between a base portion of the stub shaft and an opposing surface defining a cylindrical recess in the inner side of the end wall 2.

It is apparent from the above that the roller 11 is rotatably journaled in the roller support 13, and that the roller support 13 is, in its turn, rotatably journaled in the valve housing.

As shown on the drawings, the roller support 13 is in the form of a yoke comprising a web 13a having cylindrical inner and outer peripheral surfaces and two projecting shanks or arms 13b in which the roller shaft 12 is eccentrically journaled relative to the common longitudinal axis A of the stub shafts 14a, 14b. The axis A is located between the longitudinal rotational axis B of the roller 11 and the inside of the yoke web 13a on a plane along the centre line of the web and the common stub shaft axis B.

As is most clearly apparent from FIGS. 1 and 3, the roller support stub shaft 14b situated at the distal end of the valve housing in relation to the inlet, and more precisely, in the region between the end wall 2 and the bracket 17, is connected to one end of an arm 19 which, at its other end, is connected to a float 20. The connection between the arm 19 and the stub shaft 14b is a positive-type connection, which is provided, for example, in that the stub shaft 14b and an opening in the arm 19 for accommodating the stub shaft have mutually corresponding planar surface portions.

By pivotal movement of the arm 19 as a consequence of movements of the float 20 in the cistern when the water level 25 rises or falls the roller support 13 is rotated in the valve housing. Because of the eccentric journaling of the roller 11, the roller shaft 12 is movable in a path which, when the roller moves in the closing direction, approaches the inner circumferential surface of the valve housing. On closing of the valve, the roller which rolls on said inner circumferential surface, is thus urged with increasing force against said surface in order, in the closed position, to be held with a suitable closing force against a valve seat formed by a port of the inner peripheral surface of the valve housing in the area of the slot 10. The roller can (but need not) be held in contact with the inside of the valve housing already in its initial open position, in which case it is necessary that some part of unit consisting of the roller support 13 and roller 11 be flexible. An adequately adjusted closing pressure of the roller 11 is obtained by suitable selection of the eccentricity C between the axes A and B, by making the roller 11 of a flexible material and/or by making the roller shaft 12 resilient and/or possibly resiliently supported by means of the roller support 13.

In the illustrated preferred embodiment, the roller 11 consists of a flexible material.

The following points have been taken into consideration for the dimensions and choice of material in the construction of the valve.

The dimensions of the yoke 13 (the thickness of the web 13a and the length of the arms 13b) and the dimensions of the roller 11 have, in the illustrated preferred embodiment, been selected for a tubular valve housing 1 with the extension thereof forming the socket 3 which for practical reasons, is dimensioned such that the socket 3 can have an external thread (for example a thread diameter of 25.4 mm) which is normal for the connection of float-valve to inlet pipes. In order to satisfy the inner space requirement (given that the axis A coincides with the longitudinal axis of the cavity) it has proved advisable to dimension the unit comprising the roller 11 and the roller support 13 such that its cross-section fits into a circumscribed circle which is not larger than approximately 1.5-2 times the diameter of the roller. Furthermore, it is advantageous for purposes of durability that the cross-section of the roller support is shaped as shown in FIGS. 2 and 3, i.e., a cross section in the form of a crescent or alternatively U- or V-section.

In order to facilitate mounting and dismounting of the roller 11, the roller shaft 12 is not journaled in holes in the arms 13b of the roller support 13 but instead in open grooves in the arms. The spider 16 with its hub 15 for journaling of one end of the roller shaft 12 is inserted in the valve housing from the end of the socket 3 and held in position by a tight fit in the valve housing. The hub 15 can consist of a ring provided with recesses for forming the spider arms 16. The retaining hub portion 16 need not, however, be in the form of a cross but can, for example, be stellar or any other suitable shape permitting flow passage. The positive connection between the stub shaft 14b and the operating arm 19 can be arranged so as to permit insertion of the stub shaft 13 in the opening in the arm 19 on insertion of the roller support 13 into the housing prior to the mounting of the hub 15. The purpose of the valve housing projection 17 is to support the stub shaft 14b in the region of the connection with the operating arm 19, whereby the stub shaft can be made relatively thin and easy running.

On either side of the outlet 10 the valve housing 1 has projections forming walls 7a, 7b, 7c, 7d, defining a chamber 21, one wall of which forms the previously mentioned wall 7a which abuts against the cistern wall 6. This chamber is closed at the bottom by means of a lid 22 which, for example by a close fit along its periphery, in grooves in the walls 7a, 7b or by other suitable sealing means seals the chamber 21 exteriorly and forms a connection with the valve housing 1 after assembly. The lid 22 supports a socket 23 which may be formed integrally with the lid and which is shaped so as to permit insertion and connection to an outlet pipe 23' whose lower end is to open, in the illustrated embodiment, below the water level 25 in the cistern even at the lowest water level (a substantially empty cistern) to permit silent filing of the cistern. The lid 22 is provided with at least one (three, in the illustrated embodiment) venting ports 24 and supports on its upper side an elastic diaphragm 26 which is provided with a flap-like projection 27 fixedly mounted in a hole in the lid. The upper slide of the lid 22 forms a valve seat and the diaphragm 26 forms a valve member of the non-return-type which is normally maintained in abutment against the lid and prevents water from draining out through the slots 24 but allows the passage of air into the chamber when the pressure therein shows a tendency to decrease. The described non-return valve serves as a so-called reflux protection device which is per se known in refilling valves.

If the valve according to the invention is, as in the above-described case, to be used as a refilling valve, the rolling surface in the housing 1 for the roller 11 can advantageously be formed in a particular way to provide a marked step or "threshold" for a distinct closing moment of the valve, that a distinct, final pivoting moment of the operating arm 19 to close the valve. The reason for this is that, if the operating moment is constant, the final closing of the valve will, for known reasons, by subjected to an undesirable delay. So-called rapid shut-off of the valve can also be achieved, if the operating moment of the valve during the closing process (when the float 20 moves upwardly in the cistern following the rising water level) successively increases and reaches a peak, subsequently decreasing just before total shut-off. In the valve according to the invention this is easily achieved in that the valve seat is formed with a shoulder or threshold which the roller 11 must climb (this being possible because of the above-described resilience) on its way towards the closed position in relation to the outlet port 10. An example of a possible shape of such a shoulder or threshold is shown in profile in FIGS. 2 and 3, the shoulder being designated 29. The shape of the profile can, of course, be varied within certain limits to achieve the optimum position and size of the peak operating moment of the valve in relation to the buoyancy etc. of the float 20. If the valve according to the invention is to be used as a refilling valve, but in connection with an opening and closing means other than a float, another operating moment characteristic can be desirable, in which case the profile of the valve seat can be formed to obtain this characteristic.

It has proved that a shoulder such as shoulder 29 provides another advantage. Practical tests with valves according to the invention have established that a roller 11 of rubber, rolling on a completely smooth surface always returns with surprisingly great precision to the valve seat slot at the same angular position, with the result that the same part of the periphery of the roller will always be subjected to abrasion by the edges of the outlet port in the valve seat. A shoulder 29 of the above-described type automatically causes a change of the angular position of the roller 11 climbing the shoulder, whereby the roller will be uniformly worn in use.

The above description indicates the basics of how the valve according to the invention functions in its task of effectively opening (FIG. 3) and closing (FIG. 2) the connection between the conduit 4 for water under pressure and an outlet pipe 23, 23' (FIG. 1) in response to the movement of the operating arm 19. It should be noted that the pressure within the valve housing 1 not only aids in bringing the roller 11 into a sealing position in relation to the outlet port 10 in the closed position of the valve, but also aids in holding the sealing ring 18 in sealing abutment against the valve housing end wall 2 and the stub shaft 14b because of its axially directed force on the roller support 13 and the sealing ring 18.

The invention is not restricted to the above-described embodiment but may be modified in many different ways. The shape of the roller support 13 and the means for its journaling can, for example, be modified, as can the means for connecting the roller support to its operating device which, in the illustrated case, is in the form of an arm 19 and a float 20. Naturally, the outer shape of the valve housing 1 can be varied and adapted in accordance with the prevailing conditions, as can the means for mounting the valve and connecting it to an inlet conduit.

What we claim and desire to secure by Letters Patent is:

1. A rotary valve comprising an elongated valve housing having opposed ends and at least a portion of said central cavity having a substantially cylindrical inner peripheral surface and an outlet opening extending through said peripheral surface, an axial inlet at one of said housing ends, extension means on said one end for connecting the valve to a supply conduit, a roller support mounted within said housing for rotation about an axis parallel to the axis of said inlet opening, a single roller rotatably mounted on said roller support in said valve housing portion, said extension permitting insertion of said roller support and said roller into the housing, a pair of stub shafts on said roller support one at each end thereof, spaced bearing means in said housing for receiving said stub shafts to rotatably support said roller support, one of said bearing means being detachably fixed in the valve housing in a transitional region between the valve housing and the valve housing extension, said valve housing and valve housing extension each having such inner dimensions throughout their entire length that said roller support, said roller and said one bearing means are insertable through the end of said extension into the valve housing whereby the other of said stub shafts may thereby be inserted in the corresponding bearing means, said roller support being fixable in the housing by said insertable, fixable bearing means by insertion of the latter in the housing in a position on the corresponding roller support stub shaft and fixing this bearing means in the valve housing, operating means for moving said support and said roller for closing and opening said valve, said roller being supported in position to roll on said cylindrical surface to and from open and closed positions in relation to said outlet opening whereby in the closed position the outlet is fully covered by a portion of the circumference of the roller and in the open position the roller is spaced from said outlet, said roller being mounted by said roller support for rotation about an axis parallel to and spaced from the axis of rotation of said roller support.

2. The rotary valve as claimed in claim 1, further comprising a sealing ring disposed on the roller support stub shaft at the distal end of said valve housing support from the valve inlet to seal said stub shaft in relation to said valve housing end.

3. The rotary valve as claimed in claim 2, wherein said roller support stub shaft at said distal end of the valve housing is journaled in two axially spaced bearing means and is connected to the valve operating means in the region between said bearing means.

4. A rotary valve comprising an elongated valve housing having opposed ends and a central cavity with at least a portion of said central cavity having a substantially cylindrical inner peripheral surface and an outlet opening extending through said peripheral surface, an axial inlet at one of said housing ends, extension means on said one end for connecting the valve to a supply conduit, a roller support in the form of a yoke having a generally U-shaped web and a pair of roller support arms mounted within said housing for rotation about an axis parallel to the axis of said inlet opening, a pair of stub shafts one on each of said roller support arms, a single roller rotatably mounted on said support arms in said central cavity, operating means for moving said support and said roller for closing and opening said valve, said roller being supported in position to roll on said cylindrical surface to and from open and closed positions in relation to said outlet opening whereby in the closed position the outlet is fully covered by a portion of the circumference of the roller and in the open position the roller is spaced from said outlet, said roller being mounted by said stub shafts on said roller support for rotation about an axis parallel to and spaced from the axis of rotation of said roller support, means defining an outlet chamber on said housing, said outlet opening providing fluid communication between said central cavity and said outlet chamber, an outwardly open wall in said outlet chamber, a lid member mounted on and closing said outlet chamber, said lid including an outlet socket and a venting valve of the non-return type, said venting valve being closed in a direction from the chamber and operable in the opposite direction for venting said chamber to the atmosphere in the event that a vacuum is created in the chamber.

* * * * *